United States Patent Office 2,931,999
Patented Apr. 5, 1960

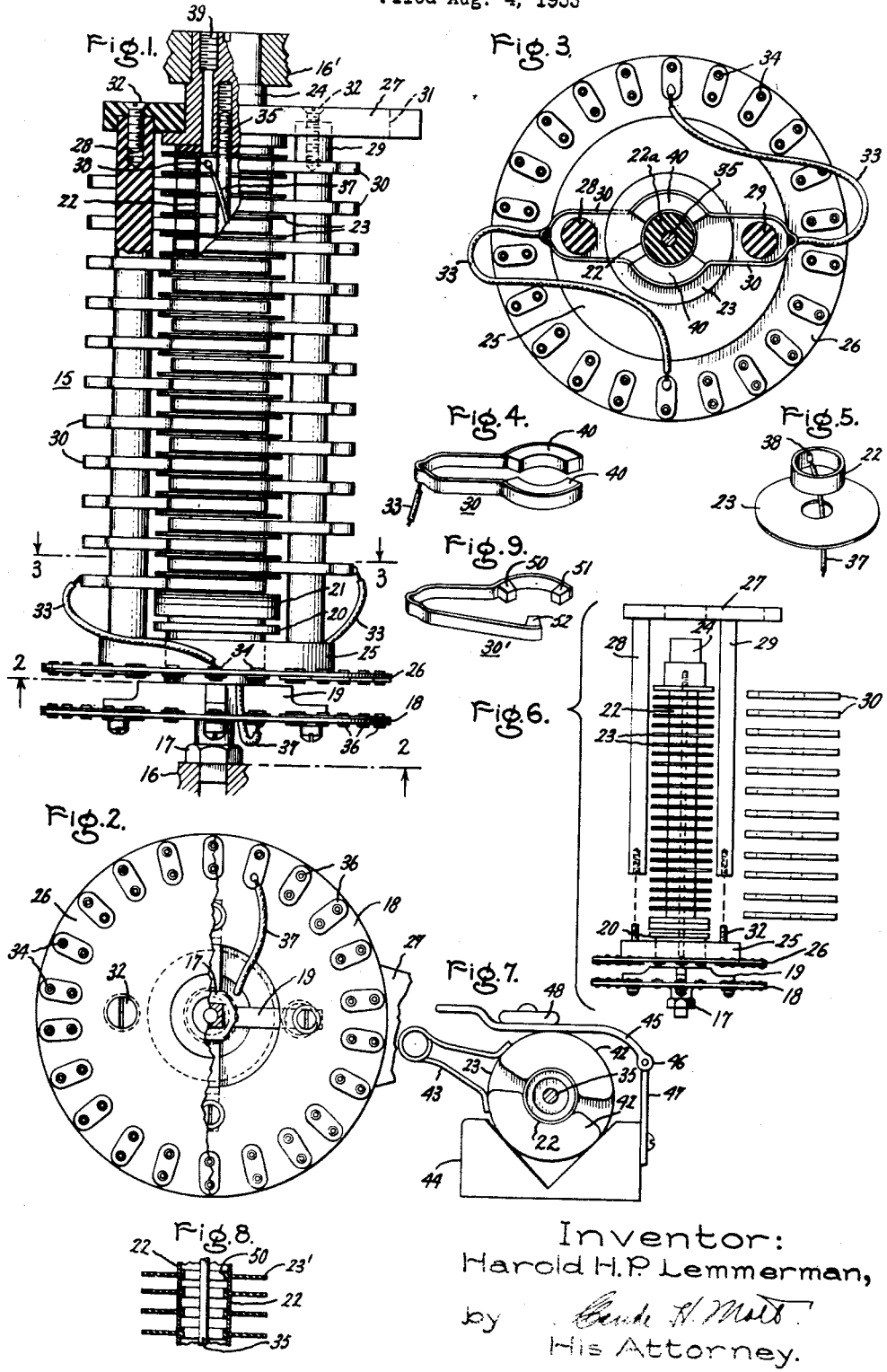

2,931,999
MULTIPLE COLLECTOR RING ASSEMBLY

Harold H. P. Lemmerman, Schenectady, N.Y., assignor to General Electric Company, a corporation of New York Application August 4, 1953, Serial No. 372,361

12 Claims. (Cl. 339—5)

This invention relates to collector ring assemblies for transferring electrical connections between relatively rotatable bodies and more particularly to such collector ring assemblies which are adapted for providing a plurality of such connections. It will be understood, of course, that the term collector ring assemblies as used in this specification may refer to structures employed for connections of circuits having little or no current flow in which the major purpose is limited to providing a voltage connection and also to structures wherein the "rings" and connections afforded thereby extend through less than 360°.

Collector ring structures for use in providing electrical connection between relatively movable members in gyros, stable tables and like devices must provide a relatively large number of such connections, and considerable space, weight, expense, and complexity are normally involved in establishing and maintaining a precise alignment of the cooperating electrical contact members which serve each individual circuit.

Accordingly, it is one object of this invention to provide a simple, inexpensive and compact collector ring structure having an inherent and built-in self-alignment feature to maintain proper alignment between cooperating current carrying members.

Another object of this invention is to provide a collector ring assembly having relatively high voltage and current ratings with small size and weight.

A further object of this invention is to provide a collector ring assembly which is characterized by reliability and maintenance of electrical contact under conditions of vibration and mechanical shock.

In certain apparatus in which the collector ring structure of this invention may be of use, a precise rotational positioning of the apparatus, including the collector ring assembly, is desired. One of the main problems in such positioning apparatus is to obtain a minimum torque requirement for the final positioning movements with a resulting minimum positioning power requirement.

Accordingly, it is a further object of this invention to provide a collector ring assembly having one value of required rotational torque for angles of rotation greater than a certain value, and having a lesser torque requirement for angles of rotation below that value.

A further object of this invention is to provide a collector ring assembly which is particularly characterized by ease of maintenance and replacement of wearing parts.

Further objects and advantages of this invention will be apparent from the following description and the accompanying drawings.

In carrying out this invention in one form a tubular cylindrical electric contact structure is provided, which is built up of a plurality of conductive rings and insulating washers secured together in axially aligned alternate stacked relation with insulating washers between adjacent rings so as to electrically insulate them from each other. Secured to one end of the tubular contact structure is a connection board from which insulated conductors are run through the tubular structure to the contact rings. Relatively rotatable electric connections are made with the conductive rings by means of a plurality of hairpin like spring brush members, one for each conductive ring, which may be characterized also as spring clips, each of which clasps and embraces a conductive ring. The clips are driven for rotation with respect to the rings by means of a pair of insulated tie rods parallel with the tubular contact structure, each of which threads loosely through the end loops of a plurality of clips to provide lost motion connections with the clips and consequent reduced torque requirements within the limits of the connections.

For a more complete understanding of the invention reference should be made to the following specification and the accompanying drawings in which:

Fig. 1 is an elevational view, partly in section, of one preferred embodiment of this invention.

Fig. 2 is a bottom view, partially in section, along the section line 2—2 of Fig. 1.

Fig. 3 is a section taken substantially along the lines 3—3 of Fig. 1.

Fig. 4 is a perspective detail view of one brush member structure which may be employed with the embodiment of Fig. 1.

Fig. 5 is a perspective detail view showing one conductive current collector ring and an associated insulator washer such as may be employed in the embodiment of Fig. 1.

Fig. 6 is a partial exploded view of the structure of Fig. 1 illustrating the method of construction and assembly.

Fig. 7 is an end view of positioning apparatus which may be employed in the assembly of the parts of the embodiment of Fig. 1, together with some of the assembled parts.

Fig. 8 is a detail sectional view of a slight modification of a portion of the structure shown in Fig. 1.

Fig. 9 is a detail view, corresponding to Fig. 4, of an alternative embodiment of the brush member.

Referring more particularly to Fig. 1, there is shown a collector ring structure which is designated as a whole as 15 having an inner assembly which may be keyed to a stationary supporting body indicated at 16 and including a lower terminal nut member 17, a multiple electrical connection board 18 supported on a spider member 19, a terminal member 20, insulating shim members 21, a series of alternately arranged cylindrical conductive rings 22 and insulator disks or washers 23, and an end terminal member 24. Member 24 is mounted for lateral support in another portion of the body 16 indicated at 16'.

The structure 15 also includes an outer assembly having a collar 25 mounted for rotation on the member 20, a connection terminal board 26 mounted for support on the collar 25, an upper terminal collar member 27 which is journaled for rotational support on inner assembly terminal member 24, and insulating tie rods 28 and 29 interconnecting the terminal collar members 25 and 27 to form a rigid assembly. The outer assembly also includes a spring clip brush member 30 having generally a U-shape embracing each of the cylindrical conductive ring members 22 of the inner assembly. Each of these brush members straddles one of the two insulating tie rods 28 or 29 so as to be rotatably driven upon rotation of the outer assembly including the terminal collar members 25 and 27 and the insulated tie rods 28 and 29. The upper terminal collar member 27 may include a radial slot shown at 31 for engagement in driving relationship with a rotatable body (not shown) to which connections are to be made from the outer assembly. The terminal collars 25 and 27 may each be suitably counterbored as shown for collar 27 to receive the ends of tie rods 28 and 29 and the fastenings at these joints may be accomplished by means of suitable threaded screws 32.

Electrical connections may be made from the outermost portions of each of the brush members 30 by means of electrical conductors 33 to suitable connection terminals 34 which may be fastened by tubular rivets to the insulated terminal board 26. Although each of the brush members 30 is intended to be connected to a terminal 34 by a suitable conductor 33, only two of the conductors 33 are shown by way of illustration for the sake of simplicity and clarity in the drawing.

The inner assembly is held in assembled relationship by a tie rod member 35 which is threaded at its upper end in a central opening in the end terminal member 24, and at its lower end on the nut 17. An electrical connection is provided from each of the rings 22 to an individual terminal 36 of the terminal board 18 by means of conductors 37. Again, for the sake of clarity, only one conductor 37 is shown, although there is intended to be a conductor from each ring 22 to a separate terminal 36. The terminals 36 may be of a construction very similar to the terminals 34 of terminal board 26. Each conductor 37 is soldered to the interior surface of the associated ring 22 as shown at 38 and the conductor is threaded through the central opening in the inner assembly which is provided by the individual central openings in the rings 22 and insulating washers 23 (Fig. 5) to emerge at the lower end of the inner assembly for electrical connection to the terminal board 18. There is sufficient space within this opening for the employment of conductors 37 having metallic shielding when necessary.

The entire central opening of the inner assembly is preferably filled after complete assembly and wiring with a suitable liquid insulating material 22a (Fig. 3) through a filler opening 39 which may be later closed with a threaded plug. The liquid filling material is polymerized or hardened to a solid mass to provide a solid connection between the individual parts of the inner assembly. For the sake of clarity, this material is not shown in the sectioned portion of Fig. 1. Obviously, a number of different suitable insulating liquids providing the proper qualities for solidification could be used. By way of illustration, one suitable material has been found to be an amine catalyzed epoxide resin adhesive and various solventless resin adhesives could also be used. When the filling material is put into the inner assembly through the opening 39, the assembly is preferably turned end for end so that the opening 39 is at the bottom, the liquid being forced in at the bottom until it achieves a level corresponding generally to the position of attachment of the spider 19 to the terminal member 20.

Fig. 2 shows a bottom view, partly cut away, along the section 2—2 of Fig. 1. The preferred arrangement of the terminals 36 and 34 on the terminal boards 18 and 26 is here clearly shown. The terminals 36 on terminal board 18 and the terminals 34 on terminal board 26 are arranged with identical angular spacing and the wiring connections are preferably made in an identical corresponding order from the respective rings 22 to the respective terminals 36 and from the respective brushes 30 to the respective terminals 34. There will then be a respective positioning of the inner and outer assemblies to index the respective terminals 34 and 36 so that each ring 22 and associated brush 30 are respectively connected to adjacent terminals 36 and 34. In the manufacture of the collector ring device 15 therefor a final check of the wiring can be easily and simply accomplished by properly indexing the two terminal boards 18 and 26, as mentioned above, and then by "ringing out" between the adjacent terminals 34 and 36 of each pair.

The arrangement of the brush members 30 on the conductive rings 22 is most clearly shown by Fig. 3 which is a sectional top view along the section 3—3 of Fig. 1.

It will be seen from this view that the brush members 30 each straddle the associated tie rod 28 or 29 with an appreciable clearance space therebetween which provides a lost motion driving connection between the tie rod 28 or 29 and the associated brush members 30. A very minimum of driving torque is therefore required to rotate the outer assembly through small angles corresponding to the distance represented by this lost motion connection since the brush members 30 need not be driven at all for these small angular movements. This is regarded as a very important advantage in applications of the collector ring device of this invention to equipment which must operate with very precise positioning. Of course, for larger angles of rotation, full torque is required until there is a reversal of rotation.

It will be seen also from Figs. 3 and 4 that the inner ends of the brush members 30 are provided with contact shoes 40 which are fastened by suitable means such as soldering or brazing to the main spring frame of the brush member. The contact shoe 40 may be fabricated of a silver graphite alloy or other suitable material as hereinafter more fully described. The inner surface of each shoe 40 is in the shape of an annular segment corresponding to the size and shape of the exterior surface of the rings 22 to provide a precise current conductive electrical contact therebetween. The insulating washer members 23 are preferably proportioned with a substantially greater outer diameter than the central ring engaging portion of the brush members 30 and with a substantially smaller inner diameter than the conductive ring member 22 in order to provide a maximum insulating air gap and creepage insulating path between adjacent brush members 30. The details of construction of the brush members 30 are further and more clearly shown by the perspective view of Fig. 4. Also, the construction of the conductive ring 22 and insulating washer 23 is more clearly shown in the perspective detail view of Fig. 5.

Fig. 6 is a partial exploded view showing a separation of the outer assembly from the inner assembly. The inner assembly is shown intact, less wiring, with the addition of the lower collar 25 carrying the terminal board 26 of the outer assembly rotatably mounted on the inner assembly terminal member 20. The combination of the upper collar member 27, and the tie rods 28 and 29 is shown in readiness for assembly to the lower collar member 25. The brush members 30 for the right-hand side of the device are also shown in readiness for "snap on" assembly to the rings 22.

The preferred method of assembly of the collector ring device or apparatus of this invention is as follows; the conductors 37 are attached to each of the associated conductive rings 22 at 38 by soldering or brazing as mentioned above. The upper terminal member 24 and as many insulating washer members 23 and conductive rings 22 as are required are stacked together in axially aligned relationship as shown, the conductor 37 of each conductive ring 22 being threaded through the openings of all lower conductive rings and insulating washers 22 and 23. Members 21 and 20 are also added, the bushing members 21, which may be referred to as spacing or shim members, being selected to provide a precise predetermined length of the inner assembly to correspond to the length of the outer assembly. Any accumulation of manufacturing tolerances of the other axially stacked components of the inner assembly can be thereby easily and simply compensated for. The collar member 25 of the outer assembly is then slipped over the terminal member 20 of the inner assembly, and the spider member 19 is fastened into place at the underside of the member 20 by means of the nut 17 and the central tie rod 35 which is threaded through the center of the inner assembly and fastened to the upper terminal member 24.

The nut 17 and tie rod 35 are hand tightened and then split washer positioning members as shown in Fig. 7 having split washer halves 42 and held together by a spring member 43 are snapped into embracing engagement with each of the conductive rings 22. As will be seen from Fig. 7, these split washers have an inner diameter corresponding to the outer diameter of the conductive rings 22, and an outer diameter corresponding to the outer diameter of the insulating washers 23. The inner assembly, as thus far assembled, is then placed in a horizontal position in a "V-block" 44, as shown in Fig. 7, having a length corresponding to the inner assembly length. The combination of the V-block 44 and the split washers including the washer halves 42 provide precise axially aligned positioning of all of the insulating washers 23 and all of the conductive rings 22 in axially aligned relationship with one another. The nut 17 may be loosened on its connection with tie rod 35 when the inner assembly is in this fixture, to permit all of the insulating washers 23 and the conductive ring and split washer combinations to settle down into the V-block 44 to obtain this exact positioning. A hinged cover 45 may also be provided which may be hinged as at 46 for support on the V-block 44 by a hinge plate 47. The cover 45 may be provided with an added weight 48 so as to be capable of biasing any of the insulating washers 23 or the combinations of rings 22 and split washers 42 which may not be down against the V-block 44 into that aligned position.

The nut 17 may then be tightly fastened and the insulating liquid filler may be forced into the inner assembly through the filler hole 39 as described above. The inner assembly may be either left in the V-block 44 while the insulating liquid is forced into the central portion thereof or it may be removed from the V-block 44, relying for maintenance of the axially aligned position of all the parts on the tightening force of the tie rod 35. In either case, as mentioned above, the inner assembly is preferably placed in a vertical position with the filler hole 39 at the bottom so as to assure complete filling of the central space. The inner assembly is then left to cure for a period to allow the liquid insulating material to harden. The split washers 42 may then be removed.

The outer assembly terminal board 26 may next be threaded over the spider 19, suitable openings in the central portion of terminal board 26 being provided for this purpose, and fastened in place on the lower collar member 25. The inner assembly terminal board 18 may then be fastened by means of suitable screws to the spider member 19 and the connections 37 may then be made to this terminal board. The outer assembly parts, including the upper collar 27, the insulating tie rods 28 and 29 may then be joined together and fastened to the lower collar member 25 by means of screws 32, the upper collar member 27 being slipped over the bearing surface of the upper collar member 24 of the inner assembly.

The brush members 30 may then be snapped on to the conductive rings 22 as shown in Fig. 1. Electrical conductors 33 from the brush members 30 to the terminal board 26 may then be added.

Rather than requiring a fixture such as the V-block 44 of Fig. 7 to obtain precise alignment of the parts of the inner assembly and particularly of the conductive rings 22 and the insulating washers 23, the washers 23 may be molded or formed with an axially extending flange on the inner diameter thereof as shown at 50 in Fig. 8. These modified insulating washers are indicated as 23' in Fig. 8 which is a partial sectional view of the inner assembly showing the nesting relationship which is obtainable in the assembly with the inner flanges 50. The flanges 50 nest within the inner diameter of the conductive rings 22 and thus provide for an immediate axial alignment between adjacent conductive rings 22 and insulating washers 23' without the need for a special positioning and alignment fixture such as is shown in Fig. 7. This is regarded as illustrative of the various self-aligning modifications which are possible.

If there is a desire to provide a form of the collector ring structure of this invention which is of absolutely minimum weight, and of low torque, having a low contact pressure, the brush member 30 may be modified as shown at 30' in Fig. 9. Three brush shoe members 50, 51 and 52 of short arcuate length are provided rather than the two wide arc brush shoe members 40 of Fig. 4. It will be understood, of course that where currents are small, the contact pressure for either the brush structure of Fig. 4 or Fig. 9 may be decreased very simply by spreading the legs of the brush frame to decrease brush friction. By this method of adjustment, any desired contact pressure may be selected.

The frame of the brush member 30 is preferably made of a good spring material which is also a reasonably good electrical conductor for instance such as one of the spring metal alloys—commonly referred to as Phosphor bronze, while the contact shoes 40 or 50, 51, and 52 may be made of a good electrical contact material such as silver or preferably a silver graphite alloy which is self-lubricating. The insulating washers 23 may be made of any suitable insulating material but are preferably made of a laminated cloth filled resinous plastic material such as glass fabric impregnated with melamine resin for maximum strength and insulating properties with a minimum thickness and weight. The conductive rings 22 may be either made entirely of silver or the exterior may be plated with silver to form a good conductive surface.

It will be noted that each brush member 30 not only embraces or squeezes the associated conductive ring or collector ring member 22 but is actually supported on that ring. The insulating washer members 23 maintain a continuous axial mechanical and electrical separation between adjacent brush members 30. The brush members 30 are therefore automatically maintained in perfect alignment with each associated collector ring and no separate structure is necessary to achieve and maintain alignment between brush holders and collector rings. In the assembly of the collector ring structure of this invention, the accumulation of axial manufacturing dimensional tolerances in the rings 22 and washers 23 may create a difference between the axial length of the corresponding portions of the inner and outer assembly. This difference is completely compensated for by the proper selection of spacing washers 21 as described above to provide the exact axial length for the inner assembly to match the predetermined dimensions of the outer assembly as determined by the length of the insulated connector rods 28 and 29 as well as by the dimensions of the other associated parts.

It will be appreciated that by virtue of the relatively low mass of the brush member 30 in relation to the spring force derived from the frame portion to maintain the brush member in assembled relationship, embracing the ring 22, this collector ring apparatus is capable of withstanding very substantial mechanical shocks and high amplitude vibration accelerations without causing either momentary or permanent disconnections of the circuits provided thereby. Since the contact shoes 40 obviously provide a relatively wide angle of contact with the conductor ring 22, a large contact area is provided for each circuit which is served by this collector ring apparatus which permits relatively high current densities without undue heating or wear or injury to the contacts.

Since any one of the contact members 30 may be easily unsnapped from the assembled position shown in Fig. 1 to the disassembled position as illustrated by Fig. 6 by merely grasping the outer end and pulling, it is obvious that the individual brush members 30 may be easily replaced by unsnapping the old one, disconnecting the associated conductor 33, reconnecting a new brush member and snapping the new brush member into the reassembled position.

Although in this disclosure, the inner assembly has been indicated as stationary and the outer assembly as rotatable, it will be obvious that the inner could be rotatable and the outer stationary, or both could be rotatable. The main feature of course is that the inner and outer assemblies can be relatively rotatable.

While only certain preferred embodiments of the invention have been described and illustrated by way of example in the foregoing, many modifications will occur to those skilled in the art and it therefore should be understood that the appended claims are intended to cover all such modifications as fall within the true spirit and scope of the invention.

What I claim as new and desire to secure by Letters Patent of the United States is:

1. A collector ring structure for transmitting an electrical current between relatively rotatable bodies comprising at least one cylindrical member, at least a portion of the outer cylindrical surface thereof being composed of electrically conductive material, at least two insulating members respectively positioned adjacent the ends of said cylindrical member and having a greater radial dimension than said cylindrical member, said cylindrical member and said insulating members being connected to one of said bodies, a spring clip brush member connected to the other of said bodies, said brush member including contact shoes of concave annular segmental configuration in embracing relationship with diametrically opposed portions of said cylindrical surface.

2. A collector ring structure for transmitting an electrical current between relatively rotatable bodies comprising at least one cylindrical member having an outer cylindrical conductive surface, at least two insulating members having circular faces respectively positioned adjacent and axially aligned with the ends of said cylindrical member, said faces each having a greater diameter than said cylindrical member, said cylindrical member and said insulating members being connected to one of said bodies, a spring clip brush member connected to the other of said bodies, said brush member including contact shoes of concave annular segmental configuration in embracing relationship with diametrically opposed portions of said cylindrical surface, the portions of said faces protruding beyond the diameter of said cylindrical member providing for alignment of said brush member.

3. A multiple contact collector ring apparatus for transferring electrical connections between relatively rotatable bodies comprising a plurality of alternately axially arranged collector rings and insulating washers connected for rotation with one of said bodies, said washers having greater radii than said rings, a separate U-shaped spring brush member arranged for relative rotation with the other of said bodies and having each of the legs thereof in embracing engagement with diametrically opposite portions of each of said rings and supported thereon, the portion of each leg in embracing engagement having a concave annular segmental surface corresponding to the outer surface of the associated ring.

4. A collector ring apparatus for transferring electrical connections between relatively rotatable bodies comprising an inner assembly and an outer assembly respectively arranged for rotation with said bodies, said inner assembly comprising a plurality of alternately axially arranged insulating members and ring members having outer cylindrical conductive surfaces, said insulating members each having a central opening therein and a greater radial dimension than said ring members, a separate electrical conductor connected to the inner surface of each of said ring members and extending axially through the interior of said inner assembly to provide external electrical connections therewith, said outer assembly including at least one insulating rod member arranged in spaced parallel relationship with the axis of said inner assembly, a separate spring clip contact member having diametrically opposed legs with the ends thereof embracing each of said rings to provide an electrical connection therewith, said legs being in spaced stradding relationship with said rod member to provide a lost motion connection therewith.

5. A collector ring apparatus for transferring electrical connections between relatively rotatable bodies comprising an inner assembly and an outer assembly respectively arranged for relative rotation with said bodies, said inner assembly comprising a plurality of alternately axially arranged insulating washers and conductive ring members said washers each having a greater diameter than said ring members, a separate electrical conductor connected to the inner surface of each of said ring members and extending axially through the interior of said inner assembly defined by the inner diameters of said washers and ring members to provide external electrical connections therewith, said outer assembly including at least one insulating rod member arranged in spaced parallel relationship with the axis of said inner assembly, a separate spring clip contact member having diametrically opposed legs with the ends thereof embracing each of said rings to provide an electrical connection therewith, said contact members each including a portion surrounding said rod member in spaced straddling relationship to provide a lost motion connection therewith.

6. A collector ring apparatus for transferring electrical connections between relatively rotatable bodies comprising an inner assembly and an outer assembly respectively arranged for rotation with said bodies, said inner assembly comprising a plurality of alternately axially arranged insulating members and ring members having outer cylindrical conductive surfaces, said insulating members each having a central opening therein and a greater radial dimension than said ring members, a separate electrical conductor connected to the inner surface of each of said ring members and extending axially through the interior of said inner assembly to provide external electrical connections thereto, said inner assembly including terminal members axially positioned at each end thereof, said outer assembly including terminal members respectively engaging with and forming relatively rotatable bearing structures with said inner assembly terminal members, at least one insulating tie rod interconnecting said outer assembly terminal members, and a separate spring clip contact member having diametrically opposed legs embracing each of said rings to provide an electrical connection therewith, said contact members each including a portion in spaced straddling relationship with said tie rod to provide a lost motion connection therewith.

7. A multiple circuit collector ring assembly comprising a plurality of relatively rotatable contact members including a plurality of alternately positioned cylindrical conductive ring contact members and insulating washers assembled together in axially aligned stacked relation to form a tubular contact structure, an electrically conductive lead connected to the interior surface of each of said rings and extending axially through said tubular structure to provide electrical connections exterior thereto, terminal members axially arranged at the respective ends of said assembled rings and washers to maintain the assembled relationship, a tie rod connected between said terminal members and extending through said structure, terminal support members respectively positioned in rotational bearing relationship to each of said terminal members, at least two insulating tie rods each connected between said support members, the remainder of said contact members comprising a spring clip brush member for each of said rings, each of said brush members being arranged in a lost motion straddling relationship with one of said last mentioned tie rods and supported upon and embracing the associated ring, the portions of said brush members engaging said rings including contact surfaces having an annular shape to match the engaged surface thereof.

8. A collector ring apparatus comprising relatively rotatable inner and outer assemblies, said inner assembly comprising a plurality of alternately positioned cylindrical conductive rings and insulating washers assembled together in axially aligned stacked relation to form a tubular contact structure, an electrically conductive lead connected to the interior surface of each of said rings and extending axially through said tubular structure to provide electrical connections exterior to said inner assembly, terminal members axially arranged at the respective ends of said inner assembly to hold said rings and washers in assembled relationship, a tie rod connected between said terminal members and extending through said structure, a mass of solidified insulating material substantially filling said inner assembly, said outer assembly comprising terminal support members respectively positioned in rotational bearing realtionship to each of said inner assembly terminal members, at least two insulating tie rods each connected between said support members, a spring clip brush member for each of said rings, each of said brush members being arranged in a lost motion straddling relationship with one of said last mentioned tie rods and supported upon and embracing the associated ring, the portions of said brush members engaging said rings including contact surfaces having an annular shape to match the engaged surface thereof.

9. A method of manufacturing a multiple circuit collector ring assembly comprising the steps of attaching a separate connecting lead to the inner surface of each of a number of cylindrical collector rings, stacking a series of open centered insulating disks alternately with said rings in axially aligned relationship while concurrently threading the conductor from each ring through the central opening of each associated ring and insulating disk positioned on one side thereof, adding terminal members to the axial ends of the above arranged assembly of parts, threading a central tie rod through the assembly between said terminal members to compress the remaining parts between the two terminal members, attaching split washers to each of said rings having an inner diameter corresponding to the outer diameter of the ring and an outer diameter corresponding to the outer diameter of the insulating disks, placing the assembly in a V-block fixture to obtain exact axial alignment of all the parts, tightening the tie rod to maintain the alignment and then filling substantially the entire interior space formed by the central openings of the rings and disks with a hardenable compound.

10. A collector ring apparatus for transferring electrical connections between relatively rotatable bodies comprising an inner assembly and an outer assembly respectively arranged for rotation with said bodies, said inner assembly comprising a plurality of alternately axially arranged insulating members and cylindrical conductive members, said insulating members each having a greater radial dimension than said conductive members, said outer assembly including at least one insulating rod member arranged in spaced parallel relationship with the axis of said inner assembly, a separate spring clip contact member having diametrically opposed legs with the ends thereof embracing each of said rings to provide an electrical connection therewith, said legs being in spaced straddling relationship with said rod member to provide a lost motion connection therewith.

11. A multiple contact collector ring apparatus for transferring electrical connections between relatively rotatable bodies comprising a plurality of alternately axially spaced cylindrical conductive members and ring shaped insulating members connected for rotation with one of said bodies, said insulating members having greater outer radial dimensions than said cylindrical conductive members, and a separate spring clip contact member comprised of spring material arranged for relative rotation with the other of said bodies and having diametrically opposed annular segmental contact shoes in embracing relationship with each of said cylindrical conductive members.

12. A multiple contact collector ring apparatus for transferring electrical connections between relatively rotatable bodies comprising an inner assembly connected for rotation with one of said bodies having a plurality of alternately axially arranged cylindrical conductive members and insulating washer members, said washer members having greater outer radii than said cylindrical conductive members, and an outer assembly arranged for relative rotation with the other of said bodies including a separate spring clip brush member comprised of spring material and having diametrically opposed annular segmental contact shoes in embracing relationship with each of said cylindrical conductive members.

References Cited in the file of this patent

UNITED STATES PATENTS

| | | |
|---|---|---|
| 2,262,409 | Schuck | Nov. 11, 1941 |
| 2,436,949 | Anderson | Mar. 2, 1948 |
| 2,471,808 | Baker | May 31, 1949 |
| 2,473,526 | Hood et al. | June 21, 1949 |
| 2,509,931 | Krantz | May 30, 1950 |
| 2,557,074 | Brooks | June 19, 1951 |
| 2,677,777 | West | May 4, 1954 |

FOREIGN PATENTS

| | | |
|---|---|---|
| 566,985 | Great Britain | Jan. 23, 1945 |
| 599,058 | Great Britain | Mar. 3, 1948 |
| 607,438 | Great Britain | Aug. 31, 1948 |